United States Patent
Lee et al.

(10) Patent No.: US 9,262,054 B2
(45) Date of Patent: Feb. 16, 2016

(54) DISPLAY APPARATUS FOR DISPLAYING A CONNECTION STATE OF AN EXTERNAL DEVICE AND CONTROL METHOD

(71) Applicant: SAMSUNG ELECTRONICS CO., LTD., Suwon-si (KR)

(72) Inventors: So-la Lee, Seoul (KR); Dong-jin Na, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 13/705,348

(22) Filed: Dec. 5, 2012

(65) Prior Publication Data

US 2013/0155453 A1 Jun. 20, 2013

(30) Foreign Application Priority Data

Dec. 15, 2011 (KR) ........................ 10-2011-0135451

(51) Int. Cl.
| | |
|---|---|
| G06F 3/0482 | (2013.01) |
| G09G 5/00 | (2006.01) |
| H04N 21/436 | (2011.01) |
| H04N 21/485 | (2011.01) |
| G06F 9/44 | (2006.01) |

(52) U.S. Cl.
CPC ............ G06F 3/0482 (2013.01); G06F 9/4446 (2013.01); G09G 5/003 (2013.01); H04N 21/43615 (2013.01); H04N 21/485 (2013.01); G09G 2340/14 (2013.01); G09G 2370/22 (2013.01)

(58) Field of Classification Search
USPC .......................................... 358/1.15; 345/204
See application file for complete search history.

(56) References Cited

U.S. PATENT DOCUMENTS

| | | | | |
|---|---|---|---|---|
| 7,197,576 | B1 * | 3/2007 | Lo ........................... | H04L 29/06 710/2 |
| 7,990,370 | B2 * | 8/2011 | Jeong ............................. | 345/204 |
| 2004/0028375 | A1 * | 2/2004 | Kim et al. ....................... | 386/46 |
| 2012/0100747 | A1 * | 4/2012 | Tsai .............................. | 439/489 |

FOREIGN PATENT DOCUMENTS

| | | |
|---|---|---|
| EP | 1 970 889 A2 | 9/2008 |
| JP | 05-080884 A | 4/1993 |
| WO | WO 2009096917 A1 * 8/2009 | ............... G09G 5/00 |

OTHER PUBLICATIONS

Communication from the European Patent Office issued Feb. 27, 2013 in counterpart European Application No. 12196834.1.

* cited by examiner

*Primary Examiner* — Allen H Nguyen
(74) *Attorney, Agent, or Firm* — Sughrue Mion, PLLC

(57) ABSTRACT

A display apparatus and method are disclosed. The display apparatus according to the present disclosure includes a plurality of terminals, a display unit which displays a selection screen for selecting an external device to be connected to the display apparatus, and a control unit which controls the display unit to display a terminal image which shows a placement of the plurality of terminals and a guiding image for guiding to a terminal which corresponds corresponding to the selected external device from among the plurality of terminals when an external device is selected through the selection screen. Accordingly, a user may easily and quickly connect a connector of the external device to the terminal of the display apparatus. The display method includes displaying a connection setting menu for selecting an external device on a screen at a user's request; generating a guiding screen which includes a terminal image showing a placement state of the plurality of terminals and a guiding image for guiding to a terminal which corresponds to the external device from among the plurality of terminals, when the connection setting menu is selected; and displaying the guiding screen.

24 Claims, 6 Drawing Sheets

DISPLAY APPARATUS FOR DISPLAYING A CONNECTION STATE OF AN EXTERNAL DEVICE AND CONTROL METHOD

CROSS-REFERENCE TO RELATED APPLICATIONS

This application claims priority from Korean Patent Application No. 10-2011-0135451, filed on Dec. 15, 2011, in the Korean Intellectual Property Office on, the disclosure of which is incorporated herein by reference.

BACKGROUND

1. Field

Methods and apparatuses consistent with the exemplary embodiments relate to a display apparatus and method. More particularly, methods and apparatuses of the exemplary embodiments relate to a display apparatus which can display a connection state of an external device on a terminal of the display apparatus, and a method thereof.

2. Description of the Prior Art

Generally, on one side or rear side of a display apparatus such as a TV, there are terminals which are connected to connectors of external devices. On a display apparatus such as a smart TV, various terminals such as a LAN, USB, HDMI1, AViN, PC IN, and ANT are provided.

A display apparatus which has such various terminals is placed on one side of a wall in a wall-mountable or standing form. Since the display apparatus is placed on one side of the wall, a user is unable to easily see the direction in which the terminals provided in a direction of one side or rear side of the display apparatus are placed. Therefore, there is a problem that a user cannot easily connect a connector to a terminal which corresponds to the connector of an external device.

Moreover, in a conventional display apparatus, when a connector of an external device is connected to a terminal, information regarding whether or not the connector is properly connected to the terminal, is not provided. Therefore, a user can only know whether or not the external device is properly connected to the display apparatus based on whether or not data from the external device connected to the terminal of the display apparatus is executed through the display apparatus.

In the case of a conventional display apparatus, information regarding terminals connected to a plurality of connector terminals is not provided. Therefore, there is a problem that a user cannot readily determine to which terminal he/she should connect connectors of the plurality of external devices.

SUMMARY

An aspect of the exemplary embodiments relates to an image forming apparatus which enables convenient use by preventing the need to set a size of paper every time when a paper sensing results in a failure, when automatically sensing the size of paper, and an image forming method and recording medium thereof.

According to an exemplary embodiment of the present inventive concept, an image forming apparatus includes a display apparatus having a plurality of terminals; a display unit which displays a selection screen which selects an external device to be connected to the display apparatus; and a control unit which controls the display unit to display a terminal image showing a placement of the plurality of terminals and a guiding image for guiding to a terminal which corresponds to the selected external device from among the plurality of terminals, when the external device is selected. The control unit controls the display unit to display connection state information of each of the plurality of terminals.

The inventive concept further includes connection state information of each of the plurality of terminals having at least one of a text message showing whether or not each terminal is connected and a connector image of the external device pre-connected to the plurality of terminals. The control unit controls the display unit to change the terminal image and the connection state information in a state where the external device is connected to the terminal, when the external device is connected to the selected terminal.

In addition, the control unit controls the display unit to display the connection state information in a different color according a connection state of each of the plurality of terminals. Furthermore, the control unit controls the display unit to display the connector image showing the appearance of the connector image of the external device and a direction of connection with the terminal together with the terminal image and guiding image. Exemplary embodiments further include the screen having a state checking menu for checking a connection state of the external device, and the control unit controls the display unit to display the terminal image and the connection state information of each of the plurality of terminals, when the state checking menu is selected. Further, the plurality of terminals are placed on one side or on a rear side of the display apparatus, and the terminal image is an actual image which shows both locations and appearances of the plurality of terminals placed on one side or on a rear side of the display apparatus.

In addition, according to the exemplary embodiments the actual image includes a plurality of terminal images placed so that each of the plurality of terminals corresponds to each location placed on the display apparatus, thereby enabling a user to easily check the locations of the plurality of terminals. Further, the actual image includes a plurality of terminal images placed so that each of the plurality of terminals corresponds to each location placed on the display apparatus, and thus a placement order of the plurality of terminals is same as an order of locations of the plurality of terminals when seen by the user located at a front surface of the display apparatus. According to the exemplary embodiments, the plurality of terminals are placed in a row from a left side to a right side on a rear surface of the display apparatus, and the plurality of terminal images are displayed so that a terminal image which corresponds to a terminal placed on a far right side is displayed on a far left side on the screen of the display apparatus, while a terminal image which corresponds to a terminal placed on a far left side is displayed on a far right side on the screen of the display apparatus, when the plurality of terminal images are displayed in a row on the screen of the display apparatus. In addition, the plurality of terminals are placed in a row from a left side to a right side on the rear surface of the display apparatus, and the plurality of terminal images are displayed so that a placement order of the plurality of terminals and a displaying order of the plurality of images is opposite to each other when seen by the user from a left side to a right side one by one, when the plurality of terminal images are displayed in a row on the screen of the display apparatus.

According to the exemplary embodiments, the method includes a display method of a display apparatus which includes a plurality of terminals, the method includes displaying a connection setting menu for selecting an external device on a screen at a user's request; generating a guiding screen which includes a terminal image showing a placement state of the plurality of terminals and a guiding image for guiding to a terminal which corresponds to the external device from among the plurality of terminals, when the connection setting menu is selected; and displaying the guiding screen. The guiding screen further includes connection state information of each of the plurality of terminals. Moreover, connection state information of each of the plurality of terminals includes at least one of a text message showing whether or not each terminal is connected and a connector image of the external device pre-connected to the plurality of terminals. In addition, the methods of the exemplary embodiments include changing the terminal image and the connection state information in a state where the external device is connected to the terminal, when the external device is connected to the selected terminal.

Further, according to the exemplary embodiments, the connection state information is displayed in a different color according a connection state of each of the plurality of terminals and the guiding screen further includes a connector image showing a connector appearance of the external device and a direction of connection with the terminal. The exemplary embodiments further disclose displaying the terminal image and the connection state information of each of the plurality of terminals, when the state checking menu for checking a connection state of the external device is selected. In addition, according to the exemplary embodiments, the method includes wherein the plurality of terminals are placed on one side or on a rear side of the display apparatus, and the terminal image is an actual image which shows locations and appearances of the plurality of terminals placed on one side or on a rear side of the display apparatus.

The exemplary embodiments further include that the actual image includes a plurality of terminal images placed so that each of the plurality of terminals corresponds to each location placed on the display apparatus, thereby enabling a user to easily check the locations of the plurality of terminals. Moreover, the actual image includes a plurality of terminal images placed so that each of the plurality of terminals corresponds to each location placed on the display apparatus, and thus a placement order of the plurality of terminals is same as an order of locations of the plurality of terminals when seen by a user located at a front surface of the display apparatus. In addition, the plurality of terminals are placed in a row from a left side to a right side on a rear surface of the display apparatus, and the plurality of terminal images are displayed so that a terminal image which corresponds to a terminal placed on a far right side is displayed on a far left side on the screen of the display apparatus, while a terminal image which corresponds to a terminal placed on a far left side is displayed on a far right side on the screen of the display apparatus, when the plurality of terminal images are displayed in a row on the screen of the display apparatus. Further, according to the exemplary embodiments, the plurality of terminals are placed in a row from a left side to a right side on the rear surface of the display apparatus, and the plurality of terminal images are displayed so that a placement order of the plurality of terminals and a displaying order of the plurality of images is opposite to each other when seen by the user from a left side to a right side one by one, when the plurality of terminal images are displayed in a row on the screen of the display apparatus.

According to the exemplary embodiments, a display apparatus includes a display unit which displays a selection screen from which a user selects an external device, and a control unit which controls the display unit to display a terminal image showing a placement of a plurality of terminals and a guiding image for guiding to a terminal which corresponds to the selected external device, when the external device is selected.

Moreover, the method of the exemplary embodiments further includes displaying a connection setting menu for a user selection of an external device on a screen; generating a guiding screen which includes a terminal image showing a placement state of a plurality of terminals and a guiding image for guiding to a terminal which corresponds to the external device, when the connection setting menu is selected; and displaying the guiding screen.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
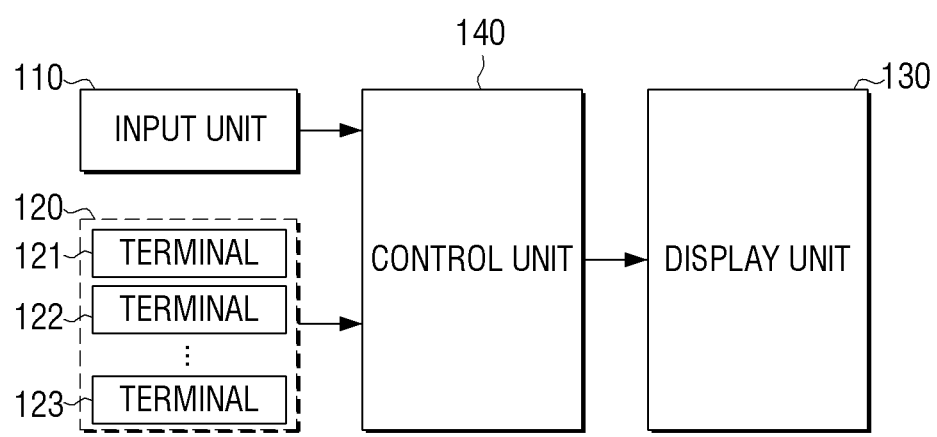
FIG. 1 is a block diagram of a display apparatus according to an exemplary embodiment of the present inventive concept.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of the exemplary embodiments. However, exemplary embodiments can be practiced without those specifically defined matters. Also, well-known functions or constructions are not described in detail since they would obscure the application with unnecessary detail.

Although a few exemplary embodiments of the present inventive concept have been shown and described, it would be appreciated by those skilled in the art that changes may be made in this embodiment without departing from the principles and spirit of the invention, the scope of which is defined in the claims and their equivalents.

FIG. 1 is a block diagram of a display apparatus according to an exemplary embodiment of the present inventive concept.

As illustrated in FIG. 1, the display apparatus includes an input unit 110, a plurality of terminals 121-123, a display unit 140 and a control unit 140.

The input unit 110 receives a user input regarding execution command information for executing an operation of the display apparatus through a remote control or a key button provided in the display apparatus. The plurality of terminals 121-123 are provided in a direction of one side or rear side of the display apparatus, and provide connections with various external devices such as a PC, set top box, mobile phone, and external hard drive. The display unit 130 displays data received through the plurality of external devices etc. or manual information for controlling each element of the display apparatus, on a screen.

When an external device is selected on the screen, the control unit 140 controls the display unit 130 to display a terminal image which shows a state of placement of the plurality of terminals 121-123 and a guiding image for guiding to a terminal which corresponds to the external device from among the plurality of terminals. For instance, in order to connect an external device such as a PC to the display apparatus, the user requests a manual execution command using an input device such as a remote control. When such manual execution command information is input through the input unit 110, the control unit 140 controls the display unit 130 to display on the screen the manual information for executing an operation of the display apparatus.

According to such a control command, in a state where the manual information is displayed through the display unit 130, when menu selection information regarding a connection to an external device is input by the user through the input unit 110, the control unit 140 controls so that a menu list regarding a plurality of external devices is displayed on the screen. In a state where such a menu list is displayed, when menu selection information of the external device to be connected to the display apparatus is input through the input unit 110, the control unit 140 controls the display unit 130 to display the terminal image which shows the state of placement of the plurality of terminals 121-123 and the guiding image for guiding to the terminal to which the external device is to be connected.

As aforementioned, the plurality of terminals 121-123 which are used to connect the display apparatus to the external devices are placed on one side or rear side of the display apparatus. In addition, the terminal image is an actual image which shows the appearance of the plurality of terminals 121-123 placed on one side or rear side of the display apparatus. Therefore, when a menu regarding the external device to be connected to the display apparatus is selected through the input unit 110, the control unit 140 controls so that the terminal image of the plurality of terminals 121-123 is displayed on a location which corresponds to the location of the plurality of terminals 121-123 placed on one side or on the rear side of the display apparatus.

However, the present disclosure is not limited to this exemplary embodiment, and thus, when the menu regarding the external device to be connected to the display apparatus is selected through the input unit 110, the control unit 140 may control so that only the terminal image to which the external device is to be connected from among the plurality of terminals 121-123, and an image of a terminal adjacent to the corresponding terminal image are displayed on the screen. According to such a control command by the control unit 140, the display apparatus 130 displays the terminal images of all the terminals 121-123 placed on one side or rear side of the display apparatus, or the terminal image of the terminal to which the external device is to be connected and the terminal image of the adjacent terminal.

Meanwhile, according to additional aspects of the present inventive concept, the actual image which shows the appearances of the plurality of terminals 121-123 placed on one side or rear side of the display apparatus 130 may include a plurality of terminal images where a location of each of the plurality of terminals 121-123 corresponds to its location in the display apparatus 130. Herein, a desirable order of placement of the plurality of terminal images which correspond to each of the plurality of terminals 121-123 is the order of placement of the plurality of terminals when seen by the user in front of the display apparatus 130. Accordingly, the user can easily check the locations of the plurality of terminals 121-123 based on the actual image representing the appearances of the plurality of terminals 121-123 displayed on the screen of the display apparatus 130.

According to exemplary embodiments, the plurality of terminals 121-123 may be placed in a row from a left side to a right side on a rear surface of the display apparatus 130. Furthermore, in a case where the plurality of terminal images which correspond to each of the plurality of terminals 121-123 are displayed in a row on the screen of the display apparatus 130, a terminal image which corresponds to a terminal placed on a far right side may be displayed on a far left side on the screen of the display apparatus 130. Moreover, a terminal image which corresponds to a terminal placed on a far left side may be displayed on a far right side on the screen of the display apparatus 130.

That is, in a case where the plurality of terminals 121-123 are placed on the rear side of the display apparatus 130 in a row from the left side to the right side and the plurality of terminal images which correspond to each of the plurality of terminals 121-123 are displayed in a row on the screen of the display apparatus 130. A displaying order of the plurality of terminal images displayed on the screen may be the opposite to the order of placement of the plurality of terminals 121-123 placed on the rear side of the display apparatus 130. That is, in a case where the user sees each of the plurality of terminal images displayed on the screen of the display apparatus 130 from the left side to the right side, the displaying order of the terminal images which corresponds to the plurality of terminals 121-123 displayed on the screen of the display apparatus 130 becomes the opposite to the placement order of the plurality of terminals 121-123 placed on the rear side of the display apparatus 130.

In such a state where a terminal image is displayed on the screen, the control unit 140 controls the display so that a guiding image for guiding to the external terminal to which the external device selected by the user is to be connected, is displayed. Herein, the guiding image is an image for guiding to the terminal to which a connector of the external device is to be connected. In this case according to exemplary embodiments, the guiding image may be a connector image of the external device. Therefore, according to a control command of the control unit 140, the display unit 130 may display the connector image of the external device, selected by the user, in a separate form from the terminal image to which the corresponding external device is to be connected, on the screen.

In addition, the control unit 140 may control the display so that a guiding message having a text form is displayed on the screen together with the guiding image for connecting the connector of the external device and the terminal. For instance, in a case of connecting a LAN connector to a terminal, the control unit 140 may control the display so that a guiding message saying "the LAN location is here. Please connect here" is displayed together on the screen with the guiding image regarding a LAN connector connection.

Meanwhile, according to additional aspects of the present inventive concept, it is desirable that the control unit 140 controls the display so that a connector image showing the connector appearance of the external device and the direction of connection with at least one of the plurality of terminals 121-123 is displayed on the screen together with the terminal image and the guiding image regarding the plurality of terminals 121-123. In general, the direction of connection of the connector of the external device with the terminal is predetermined. Therefore, the control unit 140 controls the connector image showing the direction of connection with the terminal to be displayed on the screen so that the connector of the external device is connected with the terminal in the right connecting direction.

According to such control commands, by displaying the terminal image of the plurality of terminals 121-123, guiding image and connector image showing the connecting direction of the external device on the screen, the display unit 130 may more easily connect the connector of the external device to the intended terminal from among the plurality of terminals 121-123 placed on one side or rear side of the display apparatus.

Meanwhile, it is desirable that the control unit 140 controls connection state information showing the state of connection between each of the terminals 121-123 and external devices is displayed together on the terminal image which shows the placement state of the terminals 121-123. Such connection state information shows, on the terminal image, whether or not each of the terminals 121-123 is connected to each external device, and may include at least one of the text message and connector image of the external device pre-connected to the plurality of terminals 121-123.

For example, if one of the plurality of terminals 121-123 is connected to a connector of a PC, the control unit 140 controls connection state information of a text message "ON" so that the message is displayed on the terminal image to which the connector of the PC is connected. In another example, if one of the plurality of terminals 121-123 is connected to the connector of the PC, the control unit 140 controls the connector image of the PC and the terminal image so that their connectivity is displayed.

Such a control unit 140 may also control connection state information so that the information is displayed in different colors according to connection states between the plurality of terminals 121-123 and external devices. According to exemplary embodiments, the control unit 140 may control terminals connected to an external device from among the plurality of terminals 121-123 so that the terminals are displayed in blue whereas terminals not connected to an external device is displayed in red.

According to such a control command of the control unit 140, by displaying the connection state of a connector of an external device with a terminal, through connection state information which includes at least one of a text message, image appearance, and color, the display unit 130 may easily check which terminal from among the plurality of terminals 121-123 is connected to the external device.

Meanwhile, as aforementioned, in a state where the terminal image of the plurality of terminals 121-123, include a guiding image and a connector image showing a front and back of the connector of the external device displayed on the screen, when the connector of the corresponding external device is connected to the terminal, the control unit 140 controls change in the terminal image and connection state information so that the connector of the external device is displayed as being connected to the terminal. According to exemplary embodiments, when a terminal from among the plurality of terminals 121-123 is connected to a connector of an external device, the control 140 controls the terminal image and the connector image of the external device so that they are connectively displayed. In addition, the control unit 140 changes the text message of the terminal connected to the connector of the external device from "OFF" to "ON."

According to such a control command by the control unit 140, the display unit 130 changes the appearance of the terminal image so that the connector image is connected to the terminal image of the terminal connected to the connector of the external device and displays it on the screen. In addition, by changing and then displaying the connection state information of the corresponding terminal image, the display unit 130 may easily check whether or not the external device he/she intended to connect to is actually connected to the terminal of the display apparatus.

Meanwhile, as aforementioned, in a state where the manual information is displayed on the screen, when selection information on a state check menu for checking the connection state of the external device is input by the user through the input unit 110, the control unit 140 may control the display unit 130 to display the terminal image of the plurality of terminals 121-123 and the connection state information of each of the plurality of terminals 121-123. According to such a control command, the display unit 130 displays the terminal image regarding the plurality of terminals 121-123 and the connection state information which provides the state of connection between each of the terminals 121-123 and the external device. Therefore, the user may check the terminal image and the connection state information displayed through the display unit 130, and may check to see which terminal from among the plurality of terminals 121-123 the external device is connected to.

Aforementioned was the detailed explanation of each element of the display according to the present inventive concept. Hereinafter is the detailed explanation of operations of each element of the display apparatus, as explained hereinabove, through various exemplary embodiments.

Figure 2:
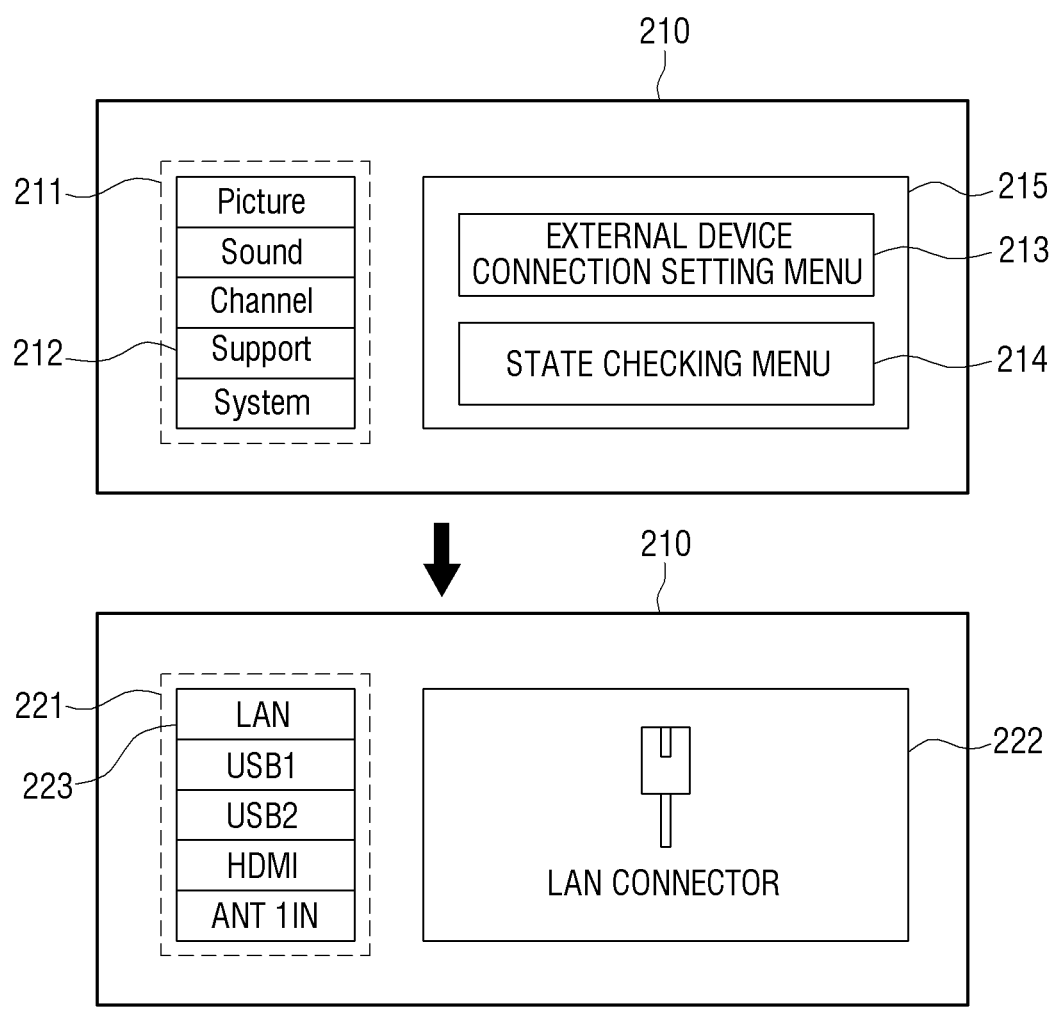
FIG. 2 is an exemplary view displaying manual information for providing a state of connection with an external device in a display apparatus according to an exemplary embodiment of the present inventive concept.

FIG. 2 is an exemplary view displaying manual information for providing, in a display apparatus, a state of connection with an external device, according to an exemplary embodiment of the present inventive concept.

As illustrated in FIG. 2, when manual execution command information is input from an input device such as a remote control through the input unit 110, the control unit 140 controls manual information 211 for executing operations of the display apparatus for display on a screen 210. According to a control command, the display unit 130 displays the manual information 211 for executing operations of the display apparatus on the screen 210. In a state where the manual information 211 is displayed on the screen 210, the user may select a "Support" menu 212 regarding the external device connection through an input device.

When the menu selection information regarding the "Support" menu 212 selection is input, according to a control command by the control unit 140, the display unit 130 displays, on screen 210, an additional menu 215 which includes a connection setting menu 213 for connecting with the external device and a state checking menu 214 for checking an external device connection state. Then, when selection command information regarding the connection setting menu 213 which is included in the additional menu 215 is input by the user, the display unit 130 displays, on screen 210, a menu list 221 regarding a plurality of external devices. However, the present disclosure is not limited to the above, and when the selection command information regarding the "Support" menu 212 is input by the user, the display unit 130 may display, on screen 210, the menu list 221 regarding the plurality of external devices.

In a state where the menu list 221 regarding the plurality of external devices is displayed on the screen 210, the user may select, through the input device a menu regarding at least one external device from among the plurality of external devices. As illustrated, on one side of the screen 210, the menu list regarding LAN, USB1, HDMI1, ANT 1IN may be displayed, and menu selection information regarding "LAN" menu 223 may be input by the user. When the menu selection information regarding the "LAN" menu 223 is input, according to a control command of the control unit 140, the display unit 130 may display additional information 222 which includes a connector image regarding the "LAN" on a side of the display where the menu list 221 is not displayed on the screen 210.

As such, when the menu selection information is input according to a request by the user, the display unit 130 may display a terminal image which shows a placement state of the plurality of terminals 121-123 and a guiding image for guiding on screen 210 the terminal to which the external device is to be connected.

Figure 3:
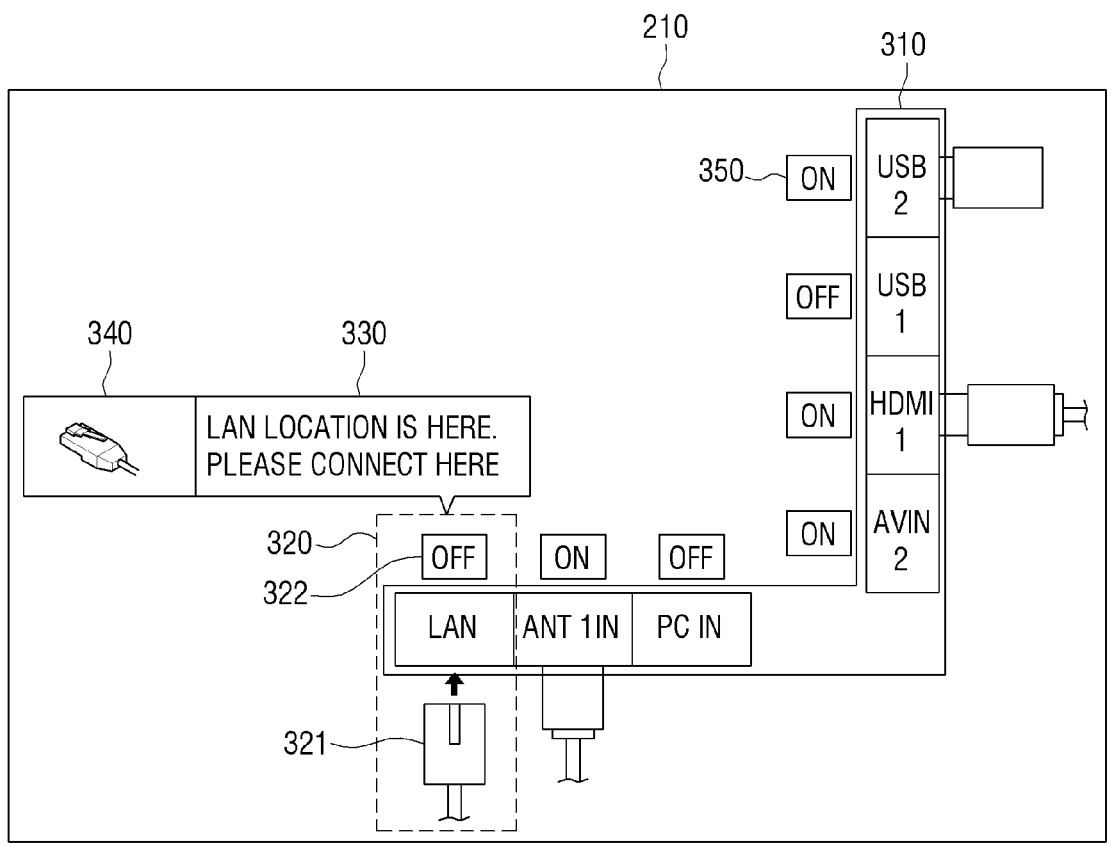
FIG. 3 is an exemplary view displaying a terminal image and a guiding image of a plurality of terminals within a display apparatus according to an exemplary embodiment of the present inventive concept.

FIG. 3 is an exemplary view displaying a terminal image of a plurality of terminals and a guiding image in a display apparatus according to an exemplary embodiment of the present inventive concept.

When external device selection information is input by the user, according to a control command of the control unit 140, the display unit 130 displays, on screen 210, a terminal image which shows a placement state of the plurality of terminals 121-123 and a guiding image 320 guiding to the terminal to which the external device is to be connected. As aforementioned, the plurality of terminals used to connect the display apparatus with the external devices are placed on one side or on a rear side of the display apparatus. In addition, each of the terminal images 310 for the plurality of terminals 121-123 is displayed on a location which corresponds to each of the terminals 121-123.

According to such a control command, in a state where the manual information is displayed through the display unit 130, when menu selection information regarding a connection to an external device is input by the user through the input unit 110, the control unit 140 controls a menu list regarding a plurality of external devices so that the menu list is displayed on the screen. In a state where such a menu list is displayed, when menu selection information of the external device to be connected to the display apparatus is input through the input unit 110, the control unit 140 controls the display unit 130 to display the terminal image which shows the state of placement of the plurality of terminals 121-123 and the guiding image for guiding to the terminal to which the external device is to be connected.

As aforementioned, the plurality of terminals 121-123 which are used to connect the display apparatus to the external devices are placed on one side or on a rear side of the display apparatus. In addition, the terminal image is an actual image which shows appearances of the plurality of terminals 121-123 placed on one side or on a rear side of the display apparatus. Therefore, when a menu regarding the external device to be connected to the display apparatus is selected through the input unit 110, the control unit 140 controls the display so that the terminal image of the plurality of terminals 121~123 is displayed on a location which corresponds to the location of the plurality of terminals 121-123 placed on one side or on a rear side of the display apparatus.

However, the present disclosure is not limited to this exemplary embodiment, and thus when the menu regarding the external device to be connected to the display apparatus is selected through the input unit 110, the control unit 140 may control the display so that only the terminal image to which the external device is to be connected from among the plurality of terminals 121-123 and an image of a terminal adjacent to the corresponding terminal image, are displayed on the screen. According to such a control command by the control unit 140, the display apparatus 130 may display the terminal image of all the terminals 121-123 placed on one side or on a rear side of the display apparatus, or the terminal image of the terminal to which the external device is to be connected and the adjacent terminal.

Meanwhile, depending on additional aspects of the present inventive concept, the actual image of the appearances of the plurality of terminals 121~123 provided on one side or on a rear side of the display apparatus 130 may include a plurality of terminal images where location of each of the plurality of terminals 121-123 corresponds to a location placed in the display apparatus 130. Herein, a desirable order of placement of the plurality of terminal images which correspond to each of the plurality of terminals 121-123 should be the order of placement of the plurality of terminals when seen by the user. Accordingly, the user can easily figure out the location of the plurality of terminals 121-123 based on the actual image representing the appearances of the plurality of terminals 121-123 displayed on the screen of the display apparatus 130.

Depending on exemplary embodiments, the plurality of terminals 121-123 may be placed in a row from a left side to a right side of a rear surface of the display apparatus 130. Furthermore, in a case where a plurality of terminal images which correspond to each of a plurality of terminals 121-123 are displayed in a row on the screen of the display apparatus 130, a terminal image which corresponds to a terminal placed on a far right side may be displayed on a far left side on the screen of the display apparatus 130. Moreover, a terminal image which corresponds to a terminal placed on a far left may be displayed on a far right on the screen of the display apparatus 130.

That is, in a case where the plurality of terminals 121-123 are placed on a rear side of the display apparatus 130 in a row from left to right and the plurality of terminal images which correspond to each of the plurality of terminals 121-123 are displayed on the screen of the display apparatus 130 in a row. The displaying order of the plurality of terminal images displayed on the screen may be the opposite to the order of placement of the plurality of terminals 121-123 placed on the rear side of the display apparatus 130. That is, in a case where the user sees each one of the plurality of terminal images displayed on the screen of the display apparatus 130, the displaying order of the terminal images which corresponds to the plurality of terminals 121-123 displayed on the screen of the display apparatus 130 becomes the opposite to the placement order of the plurality of terminals 121-123 placed on the rear side of the display apparatus 130.

In such a state where the terminal image is displayed on the screen, the control unit 140 controls the display so that a guiding image for guiding to the external terminal to which the external device selected by the user is to be connected, is displayed. Herein, the guiding image is an image for guiding to the terminal to which a connector of the external device is to be connected, in which case, according to the exemplary embodiments, the guiding image may be a connector image of the external device. Therefore, according to a control command of the control unit 140, the display unit 130 may display the connector image of the external device selected by the user in a separate form on the screen from the terminal image to which the corresponding external device is to be connected.

In addition, the control unit 140 may control the display so that a guiding message in a text form is displayed together with the guiding image for connecting the connector of the external device and the terminal on the screen. For instance, in a case of connecting a LAN connector to a terminal, the control unit 140 may control the display so that a guiding message saying "the LAN location is here. Please connect here" is displayed on the screen together with the guiding image for LAN connector connection.

Meanwhile, depending on additional aspects of the present inventive concept, it is desirable that the control unit 140 also control the display so that the appearance of a connector of the external device and a connector image showing the direction of connection with at least one of the plurality of terminals 121-123 are displayed on the screen together with the terminal image and the guiding image of the plurality of terminals 121-123. In general, the direction of connection of the connector of the external device with the terminal is predetermined. Therefore, the control unit 140 controls the connector image showing the direction of connection with the terminal to be displayed on the screen so that the connector of the external device is connected with the terminal in the correct connecting direction.

According to such control commands, by displaying the terminal image of the plurality of terminals 121-123, guiding image and connector image showing the connecting direction of the external device on the screen, the display unit 130 may more easily connect the connector of the external device to the intended terminal from among the plurality of terminals 121-123 placed on one side or on a rear side of the display apparatus.

It is desirable that the control unit 140 controls the display so that connection state information showing the state of connection between each of the terminals 121-123 and external devices is displayed together on the terminal image which shows the placement state of the terminals 121-123. Such connection state information shows on the terminal image whether or not each of the terminals 121-123 is connected to each external device, and may include at least one of a text message and the connector image of the external device preconnected to the plurality of terminals 121-123.

For example, if one of the plurality of terminals 121-123 is connected to a connector of a PC, the control unit 140 controls the display so that the connection state information of the text message "ON" is displayed on the terminal image to which the connector of the PC is connected. In another example, if one of the plurality of terminals 121~123 is connected to the connector of the PC, the control unit 140 controls the display so that the connector image of the PC and the terminal image are connectively displayed.

Such a control unit 140 may also control the display so that connection state information is displayed in different colors according to connection states between the plurality of terminals 121-123 and the external devices. Depending on the exemplary embodiment, the control unit 140 may control the display so that terminals connected to an external device from among the plurality of terminals 121-123 are displayed in blue whereas terminals not connected to an external device is displayed in red.

As such, according to a control command of the control unit 140, by displaying the connection state of a connector of an external device and a terminal through connection state information which includes at least one of a text message, image appearance, and color, the display unit 130 may easily show which terminal from among the plurality of terminals 121-123 is connected to an external device.

Meanwhile, as aforementioned, in a state where a terminal image of the plurality of terminals 121-123, a guiding image and a connector image showing a front and back of the connector of an external device are displayed on the screen, when the connector of the corresponding external device is connected to the terminal, the control unit 140 controls a change in the terminal image and connection state information so that the connector of the external device is displayed to be connected to the terminal. Depending on the exemplary embodiments, when a terminal of the plurality of terminals 121-123 is connected to a connector of an external device, the control 140 controls the display so that the terminal image and the connector image of the external device are connectively displayed. In addition, the control unit 140 changes the text message of the terminal connected to the connector of the external from "OFF" to "ON."

According to such a control command by the control unit 140, the display unit 130 changes the appearance of the terminal image so that the connector image is connected to the terminal image of the terminal connected to the connector of the external device, and displays them on the screen. In addition, by changing and then displaying the connection state information of the corresponding terminal image, the display unit 130 may easily show whether or not the external device he/she intended to connect is actually connected to the terminal of the display apparatus.

Meanwhile, as aforementioned, in a state where the manual information is displayed on the screen, when selection information on a state check menu for checking the connection state of the external device is input by the user through the input unit 110, the control unit 140 may control the display unit 130 to display the terminal image of the plurality of terminals 121-123 and the connection state information of each of the plurality of terminals 121-123. According to such a control command, the display unit 130 displays the connection state information which provides the state of connection of the terminal image regarding the plurality of terminals 121-123 with each of the terminals 121-123. Therefore, the user may check the terminal image and the connection state information displayed through the display unit 130, and see to which terminal from among the plurality of terminals 121-123 the external device is connected.

Aforementioned was the detailed explanation of each element of the display according to the present disclosure. Hereinafter is the detailed explanation of operations of each element of the display apparatus explained hereinabove through various exemplary embodiments.

FIG. 2 is an exemplary view displaying manual information for providing a state of connection with an external device in a display apparatus according to an exemplary embodiment of the present inventive concept.

As illustrated in FIG. 2, when a manual execution command information is input from an input device such as a remote control through an input unit 110, the control unit 140 controls the display unit so that manual information 211 for executing operations of the display apparatus is displayed on a screen 210. According to a control command, the display unit 130 displays the manual information 211 for executing operations of the display apparatus on the screen 210. In a state where the manual information 211 is displayed on the screen 210, a user may select a "Support" menu 212 regarding an external device connection, through an input device.

When the menu selection information regarding the "Support" menu 212 selection is input, according to a control command by the control unit 140, the display unit 130 displays an additional menu 215 which includes a connection setting menu 213 for connecting with the external device and a state checking menu 214 for checking an external device connection state are displayed on the screen 210. Then, when selection command information regarding the connection setting menu 213, which is included in the additional menu 215, is input by the user, the display unit 130 displays a menu list 221 regarding a plurality of external devices on the screen 210. However, the present disclosure is not limited to the above, and when the selection command information regarding the "Support" menu 212 is input by the user, the display unit 130 may display the menu list 221 regarding the plurality of external devices on the screen 210.

In a state where the menu list 221 regarding the plurality of external devices is displayed on the screen 210, the user may select a menu regarding at least one external device from among the plurality of external devices, through the input device. As illustrated, on one side of the screen 210, the menu list regarding LAN, USB1, HDMI1, ANT 1IN may be displayed, and menu selection information regarding "LAN" menu 223 may be input by the user. When the menu selection information regarding the "LAN" menu 223 is input, according to a control command of the control unit 140, the display unit 130 may display, on screen 210, additional information 222 which includes a connector image regarding the "LAN" on a side where the menu list 221 is not displayed.

As such, when the menu selection information is input according to a request by the user, the display unit 130 may display, on screen 210, a terminal image which shows a placement state of the plurality of terminals 121-123 and a guiding image for guiding the terminal to whichever external device is to be connected.

FIG. 3 is an exemplary view displaying a terminal image of a plurality of terminals and a guiding image in a display apparatus according to an exemplary embodiment of the present inventive concept.

When external device selection information is input by the user, according to a control command of the control unit 140, the display unit 130 displays, on screen 210, a terminal image which shows a placement state of the plurality of terminals 121-123 and a guiding image 320 guiding to the terminal the external device which is to be connected. As aforementioned, the plurality of terminals used to connect the display apparatus with the external devices are placed on one side or on a rear side of the display apparatus. In addition, each of the terminal images 310 for the plurality of terminals 121-123 is displayed on a location which corresponds to each of the terminals 121-123.

As illustrated, as terminals LAN, ANT 1IN, and PC IN are placed on a rear side bottom end of the display apparatus, a terminal image of the terminals LAN, ANT 1IN, and PC IN may be displayed on the bottom end of the screen 210. In addition, as terminals USB2, USB1, HDMI1, and AV IN are placed on one side top end of the display apparatus, a terminal image of the terminals USB2, USB1, HDMI1, and AV IN may be displayed on a right side top end of the screen 210.

However, the present inventive concept is not limited to the above, and when the menu selection information is input by the user, the display unit 130 may display the terminal image of the external device which corresponds to the input menu selection information and a terminal image adjacent to that terminal image on the screen 210. For instance, when menu selection information regarding "LAN" is input by the user, the display unit 130 may display the terminal image regarding "LAN" and the terminal image regarding the adjacent "ANT 1IN" on the screen 210.

In a state where such terminal images 310 are displayed on the screen, the display unit 130 displays a guiding image 320 for guiding to a terminal connected to an external device which corresponds to that menu selection information input by the user on the screen 210. For example, as illustrated in FIG. 3, when the menu selection information regarding "LAN" is input by the user, the display unit 130 displays the "LAN" terminal image and the "LAN" connector image 321 separately. In addition, in order to induce the "LAN" connector to be connected to the "LAN" terminal, the display unit 130 may display an arrow between the "LAN" terminal image and the "LAN" connector image 321.

In addition, according to a control command of the control unit 140, the display unit 130 may display a guiding image for connecting the connector of the external device with the terminal and a guiding message 330, in a text form. As illustrated, the display unit 130 displays a guiding message "the LAN location is here. Please connect here" on one side where the "LAN" terminal image is displayed.

In addition, the display unit 130 displays an appearance of a connector of the external device together with a connector image 340 showing a connecting direction in which the corresponding connector is to be connected on one side where the guiding message 330 is displayed. As illustrated, in the case of connecting the "LAN" connector to the "LAN" terminal, the display unit 130 displays the connector image 340 which shows the connecting direction of the "LAN" connector 321, together with the terminal image.

Meanwhile, the display unit 130 may display the connection state information which shows the state of connection between the terminals 121-123 and external devices on each terminal image 310 which shows the placement state of the plurality of terminals 121-123. As illustrated, if "USB2" connector is connected to "USB2" terminal, the display may display connection state information of a text message 350 "ON" on the "USB2" terminal image. In addition, the display unit 130 may display connection state information where "USB2" connector image is combined on the "USB2" terminal image. In addition, the display unit 130 may display connection state information in an image form where the "USB2" connector image is combined with the "USB2" terminal image. Furthermore, the display unit 130 may display connection state information having a color form which displays the color of the "USB2" terminal image in blue. As such, the display unit 130 may show that the "USB2" terminal and the "USB2" connector are connected to each other using the connection state information which includes at least one of the text form, image form, and color form.

Meanwhile, as aforementioned, when connecting the "LAN" connector to the "LAN" terminal, the display unit 130 may display the connection state information of a text message "OFF" on the "LAN" terminal image. As such, in a state were the connection state information of the text message 322 "OFF" is displayed, the display unit 130 may change the text message 322 from "OFF" to "ON" and display the text message.

Figure 4:
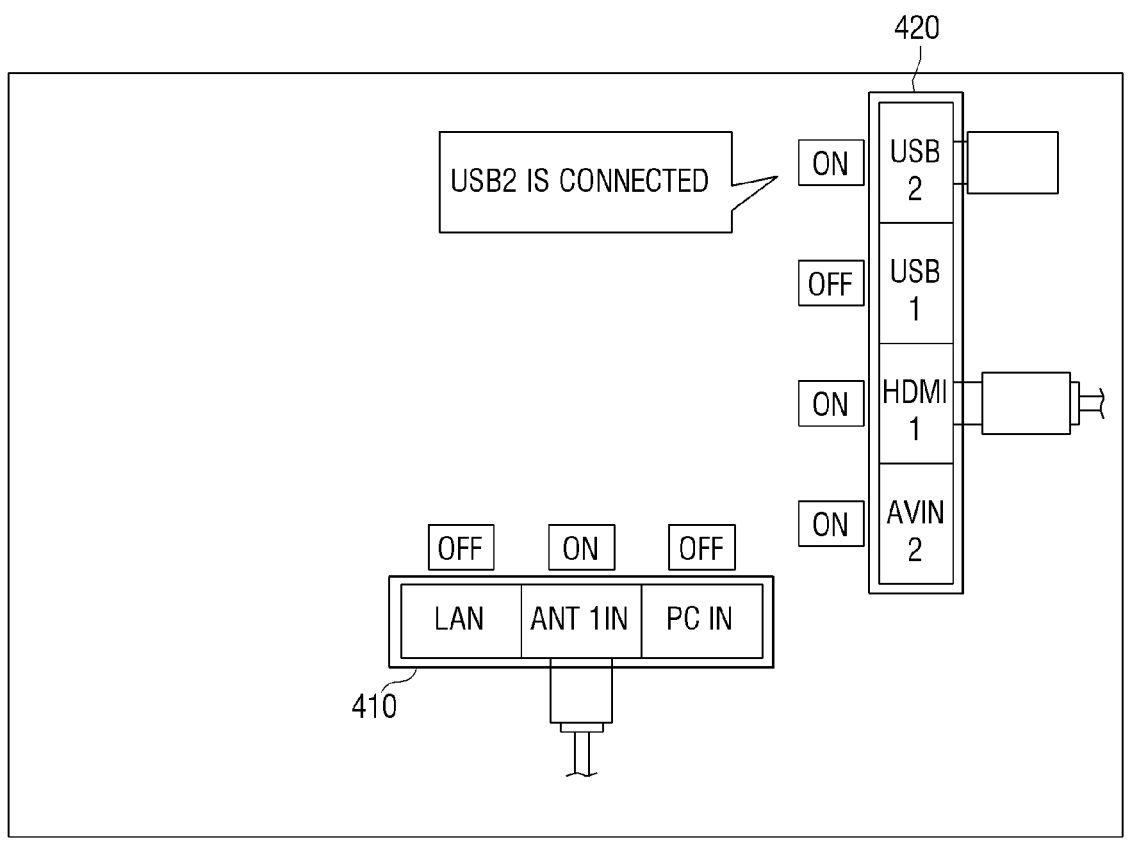
FIG. 4 is an exemplary view providing a state of connection with an external device in a display apparatus according to an exemplary embodiment of the present inventive concept.

FIG. 4 is an exemplary view providing a state of connection with an external device in a display apparatus according to an exemplary embodiment of the present inventive concept.

As illustrated in FIG. 4, upon request by the user, the display apparatus may provide a state of connection between the plurality of terminals 121-123 placed on one side or on a rear side of the display apparatus and the connector of the external device.

More specifically, as illustrated in FIG. 2, when manual execution information is input by the input device through the input unit 110, the control unit 140 controls the display device so that the manual information 211 for executing operations of the display apparatus is displayed on the screen 210. According to a control command, in a state of displaying the manual information for executing operations of the display apparatus on the screen 210, the user may select a "Support" menu 212 regarding connection with the external device through the input device.

When the menu selection information regarding the "Support" menu 212 selection is input, according to a control command by the control unit 140, the display unit 30 displays an additional menu 210 which includes a connection setting menu 213 for connection with the external device and a state checking menu 214 for checking a state of connection with the external device on the screen 210.

Then, when selection command information regarding the state checking menu 214 is input by the user, the display unit 130 may provide the connection state of the plurality of terminals 121-123 and the external device connected to at least one of the plurality of terminals 121-123.

As illustrated, as terminals LAN, ANT 1IN, and PC IN are placed on a rear bottom end of the display apparatus, the terminal image 410 of the terminals LAN, ANT 1IN, and PC IN may be displayed on the bottom end of the screen 210. Moreover, as the terminals USB2, USB1, HDMI1, and AV IN are placed on a side top end of the display apparatus, the terminal image 420 of the terminals USB2, USB1, HDMI1, and AV IN may be displayed on a right side top end of the screen 210.

As such, from among the plurality of terminals placed on one side or on a rear side of the display apparatus, the terminal ANT 1IN which is placed on the rear bottom end of the display apparatus, may be connected to the connector of the external device, while connectors of the external device may be connected to each of the terminal USB2 and terminal HDMI1 which are placed on a side top end of the display apparatus.

In this case, according to a control command of the control unit 140, the display unit 130 displays the terminal image of the terminal ANT 1IN and the connector image of the connector of the external device connected to the terminal ANT 1IN in a form combined with each other. In addition, the display unit 130 displays the terminal image of the terminal USB2 and the connector image of the connector of the external device connected to the terminal USB2 in a form combined to each other, and displays the terminal image of the terminal HDMI1 and the connector image of the connector of the external device connected to the terminal HDMI1 in a form combined with each other.

In addition, as for the terminals LAN, PC IN, USB1, and AVIN, that is the terminals that are not connected to a connector of an external device, the display unit 130 can only display the terminal image of each of the terminals. As such, depending on whether or not a terminal from among the plurality of terminals 121-123 is connected to a connector of an external device, the display unit 130 may either display a terminal image of each of the terminals 121-123 or the terminal image of the plurality of terminals 121-123 and a connector image of a connector of an external device in a combined form.

Additionally, the display unit 130 may display a guiding message in a text form on one side of the terminal from among the plurality of terminals 121-123 which is connected to an external device that guides that the terminal is connected to the external device. For example, as illustrated, when a connector of an external device is connected to the terminal USB2, the display unit 130 displays on one side where the terminal image of the terminal USB2 is displayed a guiding message having a text form saying "USB2 is connected".

Therefore, the user may not only check to which terminal from among the plurality of terminals 121-123 a connector of an external device is connected, but may also check the type of the terminal connected to the connector, through the terminal and connector image and guiding message displayed on the screen 210.

Aforementioned was the detailed explanation of operations of each element of the display apparatus according to an exemplary embodiment of the present inventive concept. Hereinafter is a detailed explanation of a method for providing a state of connection between a plurality of terminals and external devices in a display apparatus according to the present inventive concept.

Figure 5:
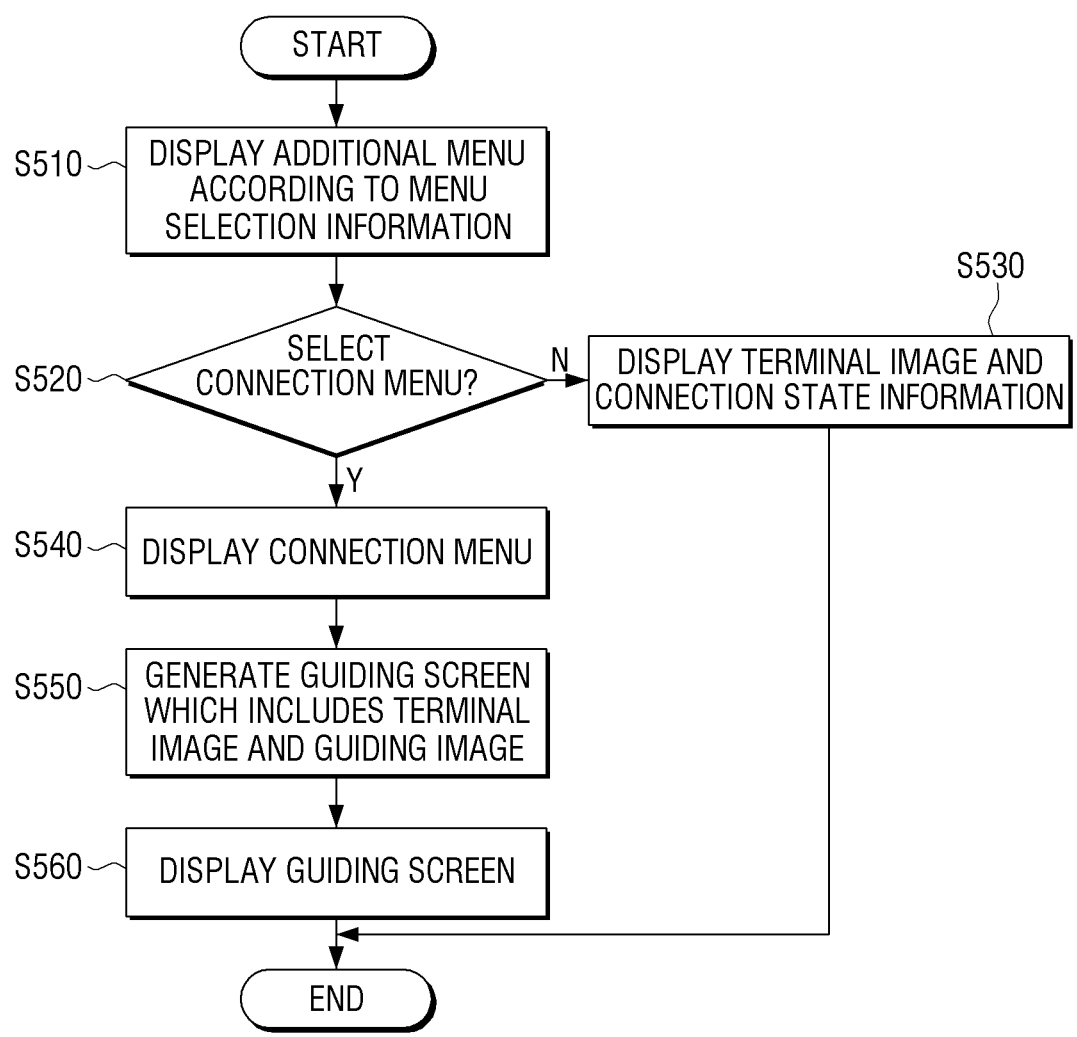
FIG. 5 is a flowchart of a method for displaying state of connections of a plurality of terminals in a display apparatus according to an exemplary embodiment of the present inventive concept.

FIG. 5 is a flowchart of a method for displaying a state of connecting a plurality of terminals in a display apparatus according to an exemplary embodiment of the present inventive concept.

As illustrated in FIG. 5, when a manual execution command is input from the input device such as a remote control at a request by the user, the display apparatus displays manual information on the screen, as illustrated in FIG. 2. In a state where the manual information is displayed, when manual selection information regarding connection with an external device is input through the input device, the display apparatus displays an additional menu which includes a connection setting menu and a state checking menu on the screen (S510). In a state where such an additional menu is displayed, the display apparatus checks whether or not the selection command information input by the user is a connection setting information for connection the external device or whether the selection command information input by a user is the state checking menu (S520). When the selection command information input by the user is a state checking menu for checking a state of the external device as a result of the checking, the display apparatus displays the terminal image regarding the plurality of terminals and the connection state information providing the connection state between each terminal and the external device on the screen as illustrated in FIG. 4 (S530).

Meanwhile, when it is checked that the selection command information input by the user is the connection setting menu as a result of the checking, the display apparatus displays the terminal image regarding the plurality of terminals and the connection state information providing the connection state between each terminal and the external device on the screen (S530).

Meanwhile, when it is checked that the selection command information input by the user is the connection setting menu as a result of the checking, the display apparatus displays the menu list regarding the plurality of external devices on the screen. In such a state where the menu list is displayed on the screen, when the connection menu for selecting at least one external device from among the plurality of externals is selected by the user, the display apparatus displays the selected connection menu on the screen (S540). Herein, the connection menu displayed on the screen at the request by the user may be additional information for explaining the external device.

When such a connection menu is selected, the display apparatus generates a guiding screen which includes the terminal image showing a placement state of the plurality of terminals and a guiding image for guiding to the corresponding terminal (S550) as illustrated in FIG. 3. When such a guiding screen is generated, the display apparatus displays the generated guiding screen on the screen (S560).

As aforementioned, the plurality of terminals used to connect the display apparatus and the external devices are placed on one side or on a rear side of the display apparatus. Therefore, the terminal image included in the guiding screen may be displayed on a point which corresponds to a point where the terminal is placed. In addition, the terminal image may be embodied as an actual image representing an appearance of the terminal which corresponds to the terminal image and displayed.

Meanwhile, according to additional aspects of the present inventive concept, the actual image representing the appearance of the plurality of terminals placed on one side or on a rear side of the display apparatus includes a plurality of terminal images placed so that each of the plurality of terminals corresponds to a location placed in the display apparatus. Herein, a desirable order of placement of the plurality of terminal images which correspond to each of the plurality of terminals should be the order of placement of the plurality of terminals when seen by a user located at the front of the display apparatus. Accordingly, the user can easily figure out the location of the plurality of terminals based on the actual image representing the appearances of the plurality of terminals displayed on the screen of the display apparatus.

Depending on exemplary embodiments, the plurality of terminals 121-123 may be placed in a row from left side to right side of a rear surface of the display apparatus 130. Furthermore, in a case where a plurality of terminal images which correspond to each of a plurality of terminals 121-123 are displayed in a row on the screen of the display apparatus 130, a terminal image which corresponds to a terminal placed on a far right side may be displayed on a far left side on the screen of the display apparatus 130. Moreover, a terminal image which corresponds to a terminal placed on a far left may be displayed on a far right on the screen of the display apparatus 130.

In a case where the plurality of terminals are placed on a rear side of the display apparatus in a row from the left to right and the plurality of terminal images which correspond to each of the plurality of terminals are displayed on the screen of the display apparatus in a row, the displaying order of the plurality of terminal images displayed on the screen may be opposite to the order of placement of the plurality of terminals placed on the rear side of the display apparatus. That is, in a case where the user sees each one of the plurality of terminal images displayed on the screen of the display apparatus, the displaying order of the terminal images which corresponds to the plurality of terminals displayed on the screen of the display apparatus becomes opposite to the placement order of the plurality of terminals placed on the rear side of the display apparatus.

Furthermore, the guiding image is an image for guiding to the terminal to which a connector of the external device is to be connected, in which case, according to exemplary embodiments, the guiding image may be a connector image of the external device. Therefore, from among the terminal images displayed on the point which corresponds to the plurality of terminals, the display unit displays the connector image of the external device selected by the user in a separate form on the screen from the terminal image to which the corresponding external device is to be connected.

According to additional aspects of the present inventive concept, the screen guidance may further include connection state information which shows a connection state of each of the plurality of terminals. Herein, the connection state information is information showing whether or not each of the terminals and the external devices are connected to each other on the terminal image displayed on the screen, and it is desirable that the connection state information includes at least one of the text message and the connector image of the external device pre-connected to the plurality of terminals.

For example, in a state where one of the plurality of terminals is connected to a connector of a PC, the display apparatus may display connection state information of a text message "ON" on the terminal image connected to the connector of the PC. Meanwhile, the display apparatus may display connection state information of a text message "OFF" on the terminal image regarding the terminals not connected to the external device. In another example, when one of the plurality of terminals is connected to the connector of the PC, the display apparatus connectively displays the connector image of the PC and the terminal image.

According to additional aspects of the present inventive concept, the connection state information may be information which is displayed in different colors depending on the connection state of each of the plurality of terminals. Depending on exemplary embodiments, terminals connected to the external device from among the plurality of terminals may be displayed in blue whereas terminals not connected to the external device are displayed in red. As such, displaying the connection state of the connector of the external device and the terminal through connection state information which includes at least one of a text message, image appearance, and color, the user may easily see which terminal from among the plurality of terminals is connected to the external device.

Meanwhile, depending on additional aspects of the present inventive concept, the aforementioned guiding screen may further include a connector image which shows the connector appearance of the external device and the direction of connection with the terminal. In general, the direction of the connection of the connector of the external device with the terminal is predetermined. Therefore, the display apparatus may display the connector image which shows the direction of connection with the terminal on the screen so that the connector of the external device is connected with the terminal in a correct direction.

As such, in a state where the guiding screen including the terminal image, guiding image and connection state information are displayed, when the connector of the external device selected by the user is connected to the terminal, the display apparatus may change the connection state information included in the guiding screen in accordance with FIG. 5.

Figure 6:
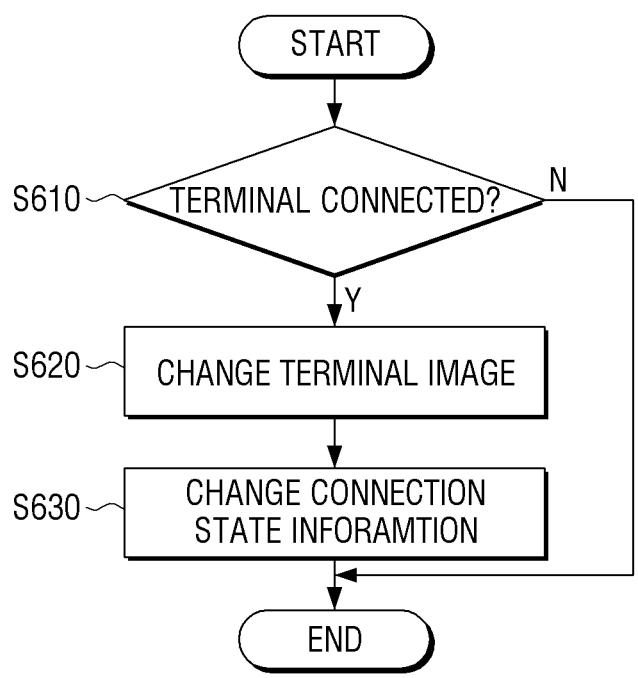
FIG. 6 is a flowchart for changing a state of connection according to a connection of an external device and a terminal in a display apparatus, according to an exemplary embodiment of the present inventive concept.

FIG. 6 is a flowchart for changing a connection state according to a connection between an external device and a terminal in a display apparatus according to an exemplary embodiment of the present inventive concept.

As illustrated in FIG. 6, in a state where the guiding screen including the terminal image, guiding image and connection state information is displayed, the display apparatus checks whether or not the connector of the external device is connected to the terminal (S610). When it is determined that the connector of the external device which corresponds to the guiding image is connected to the terminal, the display apparatus changes the appearance of the terminal image so that the connector image is connected to the terminal image of the terminal connected to the connector of the external device and displays it (S620). Then, the display apparatus changes the connection state information of the corresponding terminal image and displays it (S630).

Additionally, when the connector of the external device is connected to the terminal, the display apparatus displays the terminal image of the terminal connected to the connector of the external in blue to show that the connector and the terminal are connected to each other. For example, when the "LAN" connector is connected to the "LAN" terminal, the display apparatus changes the text message "OFF" displayed on the "LAN" terminal image to the text message "ON" and displays it, as illustrated in FIG. 3. Then, just as the "USB2" connector image is combined to the "USB2" terminal image, the display apparatus combines the "LAN" connector image to the "LAN" terminal image and displays it. Moreover, the display apparatus may show that the "LAN" terminal and the "LAN" connector is connected to each other by showing the "LAN" terminal image in blue.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display apparatus comprising:
   a plurality of terminals connected to a connector of an external device;
   a display unit which displays a selection screen for selecting an external device to be connected to the display apparatus; and
   a control unit which controls the display unit to display a terminal image showing a placement of the plurality of terminals and a guiding image for guiding to a terminal which corresponds to the selected external device from among the plurality of terminals, when the external device is selected,
   wherein a terminal image corresponding to each of the plurality of terminals is arranged in an order opposite to an arrangement order of a plurality of terminals on a rear side of the display unit, displaying locations corresponding to locations where the plurality of terminals are disposed, and
   wherein a plurality of terminal images are placed so that each of the plurality of terminals corresponds to each location placed on the display apparatus.

2. The display apparatus according to claim 1, wherein the control unit controls the display unit to display connection state information of each of the plurality of terminals.

3. The display apparatus according to claim 2, wherein connection state information of each of the plurality of terminals includes at least one of a text message showing whether or not each terminal is connected and a connector image of the external device pre-connected to the plurality of terminals.

4. The display apparatus according to claim 3, wherein the control unit controls the display unit to change the terminal image and the connection state information in a state where the external device is connected to the terminal, when the external device is connected to the selected terminal.

5. The display apparatus according to claim 2, wherein the control unit controls the display unit to display the connection state information in a different color according a connection state of each of the plurality of terminals.

6. The display apparatus according to claim 1, wherein the control unit controls the display unit to display a connector image showing an appearance of the connector image of the external device and a direction of connection with the terminal together with the terminal image and guiding image.

7. The display apparatus according to claim 1, wherein the screen includes a state checking menu for checking a connection state of the external device, and
   the control unit controls the display unit to display the terminal image and the connection state information of each of the plurality of terminals, when the state checking menu is selected.

8. The display apparatus according to claim 1, wherein the plurality of terminals are placed on one side or on a rear side of the display apparatus, and
   the terminal image is an actual image which shows both locations and appearances of the plurality of terminals placed on one side or on a rear side of the display apparatus.

9. The display apparatus according to claim 8, wherein the actual image includes a plurality of terminal images placed so that each of the plurality of terminals corresponds to each location placed on the display apparatus, and thus a placement order of the plurality of terminals is same as an order of locations of the plurality of terminals when seen by the user located at a front surface of the display apparatus.

10. The display apparatus according to claim 8, wherein the plurality of terminals are placed in a row from a left side to a right side on a rear surface of the display apparatus, and
    the plurality of terminal images are displayed so that a terminal image which corresponds to a terminal placed on a far right side is displayed on a far left side on the screen of the display apparatus, while a terminal image which corresponds to a terminal placed on a far left side is displayed on a far right side on the screen of the display apparatus, when the plurality of terminal images are displayed in a row on the screen of the display apparatus.

11. The display apparatus according to claim 8, wherein the plurality of terminals are placed in a row from a left side to a right side on the rear surface of the display apparatus, and
    the plurality of terminal images are displayed so that a placement order of the plurality of terminals and a displaying order of the plurality of images is opposite to each other when seen by the user from a left side to a right side one by one, when the plurality of terminal images are displayed in a row on the screen of the display apparatus.

12. A display method of a display apparatus which includes a plurality of terminals for connecting to a connector of an external device, the method comprising:
    displaying a connection setting menu for selecting an external device on a screen at a user's request;
    generating a guiding screen which includes a terminal image showing a placement state of the plurality of terminals and a guiding image for guiding to a terminal which corresponds to the external device from among the plurality of terminals, when the connection setting menu is selected; and
    displaying the guiding screen,
    wherein a terminal image corresponding to each of the plurality of terminals is arranged in an order opposite to an arrangement order of a plurality of terminals on a rear side of the display unit, displaying locations corresponding to locations where the plurality of terminals are disposed, and
    wherein a plurality of terminal images are placed so that each of the plurality of terminals corresponds to each location placed on the display apparatus.

13. The display method according to claim 12, wherein the guiding screen further comprises connection state information of each of the plurality of terminals.

14. The display method according to claim 13, wherein connection state information of each of the plurality of terminals includes at least one of a text message showing whether or not each terminal is connected and a connector image of the external device pre-connected to the plurality of terminals.

15. The display method according to claim 14, further comprising changing the terminal image and the connection state information in a state where the external device is connected to the terminal, when the external device is connected to the selected terminal.

16. The display method according to claim 13, wherein the connection state information is displayed in a different color according a connection state of each of the plurality of terminals.

17. The display method according to claim 12, wherein the guiding screen further comprises a connector image showing a connector appearance of the external device and a direction of connection with the terminal.

18. The display method according to claim 12, further comprising displaying the terminal image and the connection state information of each of the plurality of terminals, when the state checking menu for checking a connection state of the external device is selected.

19. The display method according to claim 12, wherein the plurality of terminals are placed on one side or on a rear side of the display apparatus, and
the terminal image is an actual image which shows locations and appearances of the plurality of terminals placed on one side or on a rear side of the display apparatus.

20. The display method according to claim 19, wherein the actual image includes a plurality of terminal images placed so that each of the plurality of terminals corresponds to each location placed on the display apparatus, and thus a placement order of the plurality of terminals is same as an order of locations of the plurality of terminals when seen by a user located at a front surface of the display apparatus.

21. The display method according to claim 19, wherein the plurality of terminals are placed in a row from a left side to a right side on a rear surface of the display apparatus, and
the plurality of terminal images are displayed so that a terminal image which corresponds to a terminal placed on a far right side is displayed on a far left side on the screen of the display apparatus, while a terminal image which corresponds to a terminal placed on a far left side is displayed on a far right side on the screen of the display apparatus, when the plurality of terminal images are displayed in a row on the screen of the display apparatus.

22. The display method according to claim 19, wherein the plurality of terminals are placed in a row from a left side to a right side on the rear surface of the display apparatus, and
the plurality of terminal images are displayed so that a placement order of the plurality of terminals and a displaying order of the plurality of images is opposite to each other when seen by the user from a left side to a right side one by one, when the plurality of terminal images are displayed in a row on the screen of the display apparatus.

23. A display apparatus comprising:
a display unit which displays a selection screen from which a user selects an external device, and
a control unit which controls the display unit to display a terminal image showing a placement of a plurality of terminals and a guiding image for guiding to a terminal which corresponds to the selected external device, when the external device is selected,
wherein a terminal image corresponding to each of the plurality of terminals is arranged in an order opposite to an arrangement order of a plurality of terminals on a rear side of the display unit, displaying locations corresponding to locations where the plurality of terminals are disposed, and
wherein a plurality of terminal images are placed so that each of the plurality of terminals corresponds to each location placed on the display apparatus.

24. A display method of a display apparatus, the method comprising:
displaying a connection setting menu for a user selection of an external device on a screen;
generating a guiding screen which includes a terminal image showing a placement state of a plurality of terminals and a guiding image for guiding to a terminal which corresponds to the external device, when the connection setting menu is selected; and
displaying the guiding screen,
wherein a terminal image corresponding to each of the plurality of terminals is arranged in an order opposite to an arrangement order of a plurality of terminals on a rear side of the display unit, displaying locations corresponding to locations where the plurality of terminals are disposed, and
wherein a plurality of terminal images are placed so that each of the plurality of terminals corresponds to each location placed on the display apparatus.

* * * * *